(12) United States Patent
Handyside

(10) Patent No.: US 9,204,756 B2
(45) Date of Patent: Dec. 8, 2015

(54) SLIDER GRILL

(75) Inventor: Perry Handyside, Kremmling, CO (US)

(73) Assignee: Perry Handyside, Kremmling, CO (US)

( * ) Notice: Subject to any disclaimer, the term of this patent is extended or adjusted under 35 U.S.C. 154(b) by 449 days.

(21) Appl. No.: 13/553,547

(22) Filed: Jul. 19, 2012

(65) Prior Publication Data

US 2014/0020671 A1    Jan. 23, 2014

(51) Int. Cl.
| | |
|---|---|
| *A47J 37/07* | (2006.01) |
| *F24B 1/20* | (2006.01) |
| *F23M 7/04* | (2006.01) |
| *F24C 1/16* | (2006.01) |
| *A47J 37/04* | (2006.01) |
| *A47J 37/06* | (2006.01) |

(52) U.S. Cl.
CPC .......... *A47J 37/0704* (2013.01); *A47J 37/0731* (2013.01); *F24B 1/205* (2013.01); *A47J 37/04* (2013.01); *A47J 37/067* (2013.01); *A47J 2037/0777* (2013.01)

(58) Field of Classification Search
CPC ... A47J 37/0777; A47J 37/0763; A47J 37/07; A47J 37/0795; A47J 37/0694; A47J 37/067; A47J 37/088; A47J 37/04; A47J 33/00; A47J 33/2477; A47J 2037/0777; A47J 37/0704; A47J 37/0731; F24B 1/202; F24B 1/205
USPC ......... 126/30, 29, 9 R, 9 B, 25 R, 59, 25 AA, 126/25 A; 248/149, 150, 151
See application file for complete search history.

(56) References Cited

U.S. PATENT DOCUMENTS

| | | | | |
|---|---|---|---|---|
| 416,068 A | * | 11/1889 | Muller ......................... | 126/25 R |
| 750,742 A | * | 1/1904 | Weston ........................... | 126/30 |
| 963,030 A | * | 7/1910 | Balch ............................. | 126/30 |
| 1,054,188 A | * | 2/1913 | Ehmann ................. | F16M 11/00 248/121 |
| 1,096,002 A | * | 5/1914 | Stopple ................... | F24B 1/205 126/29 |
| 1,454,385 A | * | 5/1923 | John ............................. | 126/29 |
| 1,627,513 A | * | 5/1927 | Thor ....................... | F24B 1/205 126/30 |
| 1,666,293 A | * | 4/1928 | Lorton ....................... | 211/86.01 |
| 1,667,913 A | * | 5/1928 | Weston ................. | A47B 57/18 108/186 |
| 1,796,033 A | * | 3/1931 | Lee ............................... | 126/9 R |

(Continued)

FOREIGN PATENT DOCUMENTS

| | | | | |
|---|---|---|---|---|
| DE | 3138113 A1 | * | 4/1983 | .......... A47J 37/0713 |
| DE | 3200283 A1 | * | 7/1983 | .......... A47J 37/0763 |

(Continued)

OTHER PUBLICATIONS

PCT/US2013/051382 International Search Report and Written Opinion, Mailed Apr. 7, 2014, 12pgs.

*Primary Examiner* — Gregory Huson
*Assistant Examiner* — Daniel E Namay
(74) *Attorney, Agent, or Firm* — Marsh Fischmann & Breyfogle LLP

(57) ABSTRACT

A portable cooking grill includes upright posts, rails, a grilling surface, and a fuel tray. Each rail couples a pair of the upright posts. The grilling surface is coupled with the rails and supports food for cooking. The fuel tray is coupled with the rails and receives a volume of fuel. The grilling surface and the fuel tray slide relative to each other to allow them to be relatively moved into distinct positions. In one position, the fuel tray is beneath the grilling surface. In another position, at least a portion of the fuel tray is not beneath the grilling surface.

20 Claims, 9 Drawing Sheets

(56) References Cited

U.S. PATENT DOCUMENTS

| | | | | |
|---|---|---|---|---|
| 2,122,275 A * | 6/1938 | Bitney | ............... | 126/25 R |
| 2,469,698 A * | 5/1949 | Morgan | ............... | A47J 37/0763 126/9 R |
| 2,545,005 A * | 3/1951 | Russell | ............... | A47J 37/0763 126/30 |
| 2,631,579 A * | 3/1953 | Metzger | ............... | A47J 37/0763 126/29 |
| 2,787,996 A * | 4/1957 | Rumsey | ............... | 126/25 R |
| 2,814,286 A * | 11/1957 | Arnold | ............... | 126/43 |
| 2,827,846 A * | 3/1958 | Karkling | ............... | 99/339 |
| 2,907,316 A * | 10/1959 | Windust | ............... | 126/9 B |
| 2,929,373 A * | 3/1960 | Bernstein et al. | ............... | 126/25 R |
| 3,060,918 A * | 10/1962 | Meyer | ............... | 126/9 R |
| 3,064,637 A * | 11/1962 | Thomson | ............... | 126/9 R |
| D196,019 S * | 8/1963 | Mayer | ............... | 126/25 R |
| 3,149,623 A * | 9/1964 | Orr, Jr. | ............... | A47J 37/0763 126/9 R |
| 3,421,493 A * | 1/1969 | Miller | ............... | 126/25 R |
| 3,490,433 A * | 1/1970 | Busenbarrick | ............... | 126/9 R |
| 3,837,328 A * | 9/1974 | Schaffer | ............... | A47J 37/0763 126/29 |
| 4,054,123 A * | 10/1977 | Corter | ............... | 126/505 |
| 4,191,160 A * | 3/1980 | Elliott | ............... | 126/9 R |
| 4,393,857 A * | 7/1983 | Sanford | ............... | F24B 1/205 126/30 |
| 4,488,535 A | 12/1984 | Johnson | | |
| 4,526,158 A * | 7/1985 | Lee | ............... | 126/9 R |
| 4,541,406 A * | 9/1985 | DaSambiagio | ..... | A47J 37/0763 126/25 A |
| 4,589,399 A * | 5/1986 | Hamill et al. | ............... | 126/30 |
| 4,607,608 A * | 8/1986 | Allred et al. | ............... | 126/30 |
| 4,621,608 A * | 11/1986 | Lee | ............... | 126/9 R |
| 4,688,542 A * | 8/1987 | Isbell | ............... | 126/25 A |
| 4,732,138 A * | 3/1988 | Vos | ............... | 126/25 A |
| 4,836,480 A * | 6/1989 | Besner | ............... | 248/125.3 |
| 4,920,949 A * | 5/1990 | McDonald | ............... | 126/25 R |
| 5,297,534 A * | 3/1994 | Louden | ............... | 126/30 |
| 5,406,931 A * | 4/1995 | Montgomery | ............... | 126/30 |
| 5,452,706 A * | 9/1995 | Meza | ............... | 126/30 |
| D370,387 S * | 6/1996 | Dorvall | ............... | D7/332 |
| 5,558,008 A | 9/1996 | Jenkins | | |
| 5,802,962 A * | 9/1998 | Goldyn | ............... | 99/421 H |
| 5,850,829 A * | 12/1998 | Taylor et al. | ............... | 126/30 |
| 5,908,026 A * | 6/1999 | Forst | ............... | 126/25 AA |
| 5,931,085 A * | 8/1999 | Benzschawel | ............... | 99/449 |
| 6,029,646 A * | 2/2000 | Jackson | ............... | 126/30 |
| 6,050,257 A * | 4/2000 | Bond | ............... | 126/25 R |
| 6,105,569 A * | 8/2000 | Andress | ............... | 126/30 |
| 6,131,560 A * | 10/2000 | Healy | ............... | 126/30 |
| 6,135,014 A * | 10/2000 | Chang | ............... | 99/339 |
| 6,546,851 B1 * | 4/2003 | Osborne | ............... | 99/449 |
| 6,711,993 B2 * | 3/2004 | Robertson | ............... | 99/448 |
| 6,868,849 B1 * | 3/2005 | Endres | ............... | 126/25 A |
| 7,066,432 B2 * | 6/2006 | Wood | ............... | B65B 67/1205 248/150 |
| 2001/0035176 A1 * | 11/2001 | Bush, III | ............... | 126/25 R |
| 2004/0016349 A1 * | 1/2004 | Robertson | ............... | 99/449 |
| 2004/0025859 A1 | 2/2004 | Schulte | | |
| 2004/0124324 A1 * | 7/2004 | Reed et al. | ............... | 248/146 |
| 2006/0048766 A1 * | 3/2006 | Viers | ............... | 126/25 AA |
| 2006/0076003 A1 * | 4/2006 | Smolinsky et al. | ............... | 126/9 R |
| 2006/0102163 A1 * | 5/2006 | Sanders et al. | ............... | 126/30 |
| 2006/0272630 A1 * | 12/2006 | Sanders et al. | ............... | 126/9 R |
| 2007/0095336 A1 * | 5/2007 | Pfuller | ............... | 126/9 R |
| 2009/0050755 A1 * | 2/2009 | Reed et al. | ............... | 248/127 |
| 2010/0024798 A1 * | 2/2010 | Sampson | ............... | 126/25 R |
| 2012/0312297 A1 * | 12/2012 | Walker | ............... | 126/9 B |
| 2013/0082159 A1 * | 4/2013 | Kim | ............... | 248/688 |
| 2013/0319256 A1 * | 12/2013 | Piazzi | ............... | 99/341 |
| 2014/0033932 A1 * | 2/2014 | McKee et al. | ............... | 99/448 |

FOREIGN PATENT DOCUMENTS

| | | | | |
|---|---|---|---|---|
| DE | 4316232 A1 * | 11/1994 | ......... | A47J 37/0704 |
| FR | 2619298 A1 * | 2/1989 | ......... | A47J 37/0763 |
| KR | 10-0966282 B1 | 6/2010 | | |
| WO | WO 9406334 A1 * | 3/1994 | ............. | A47J 33/00 |

\* cited by examiner

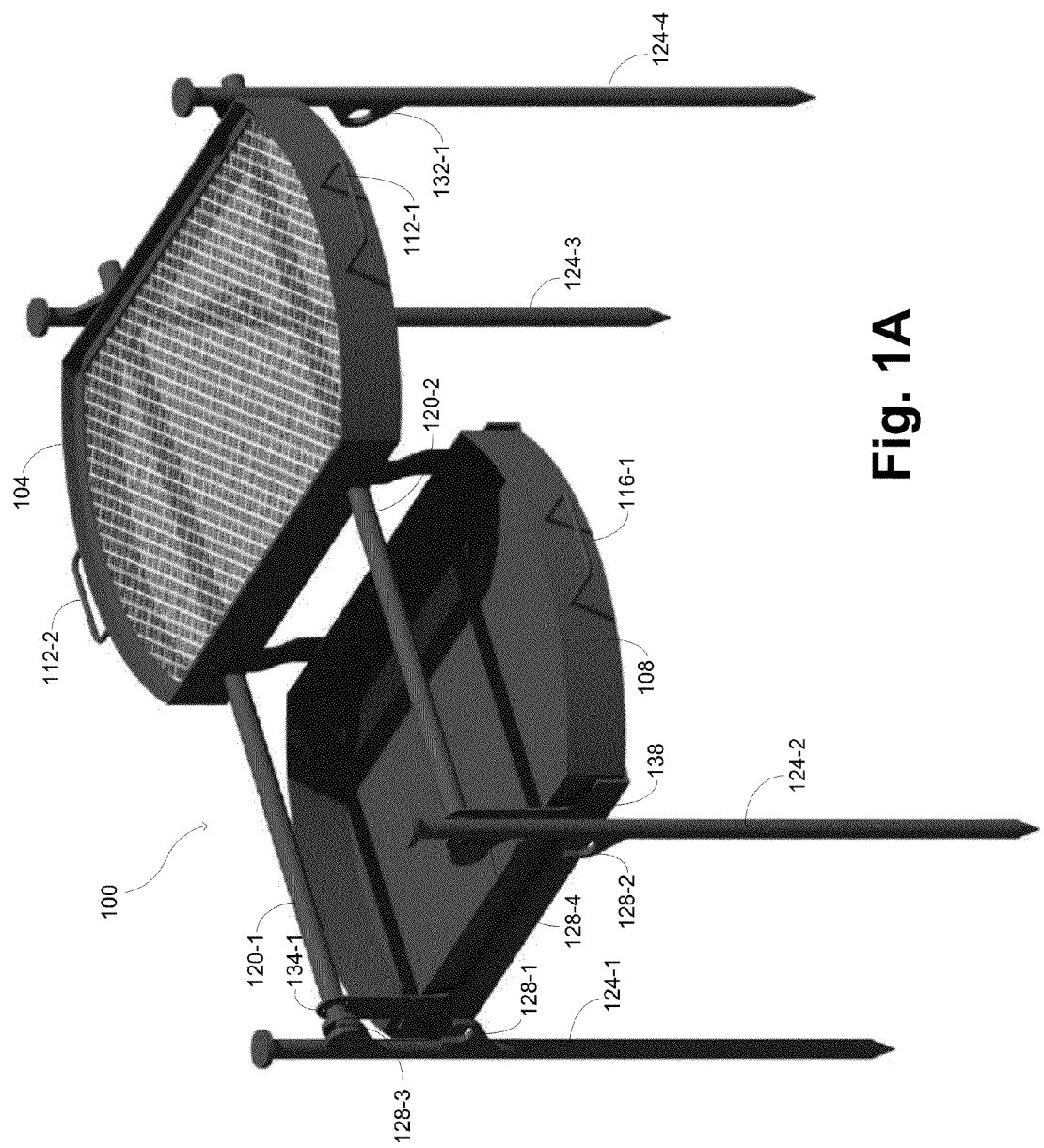

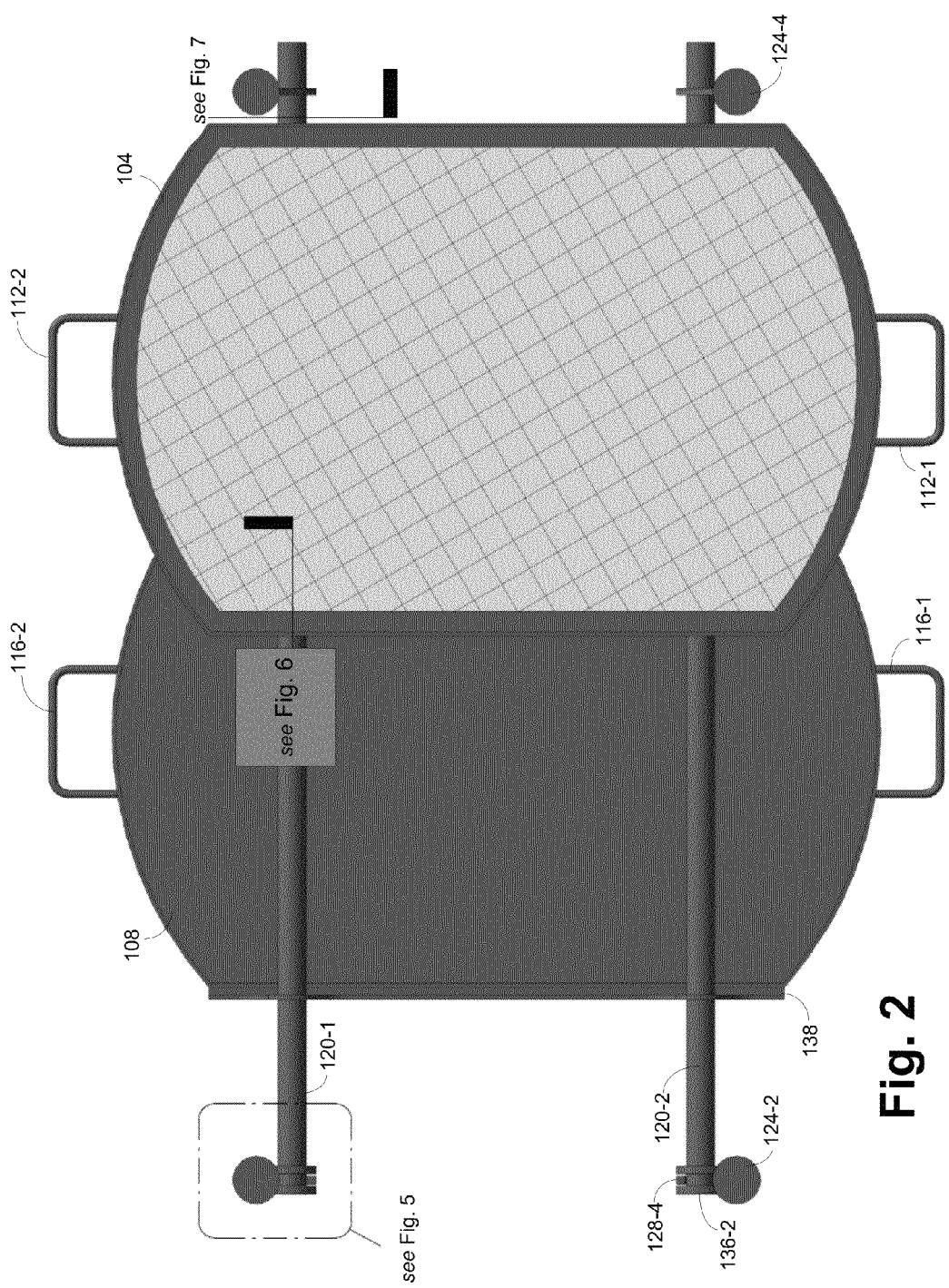

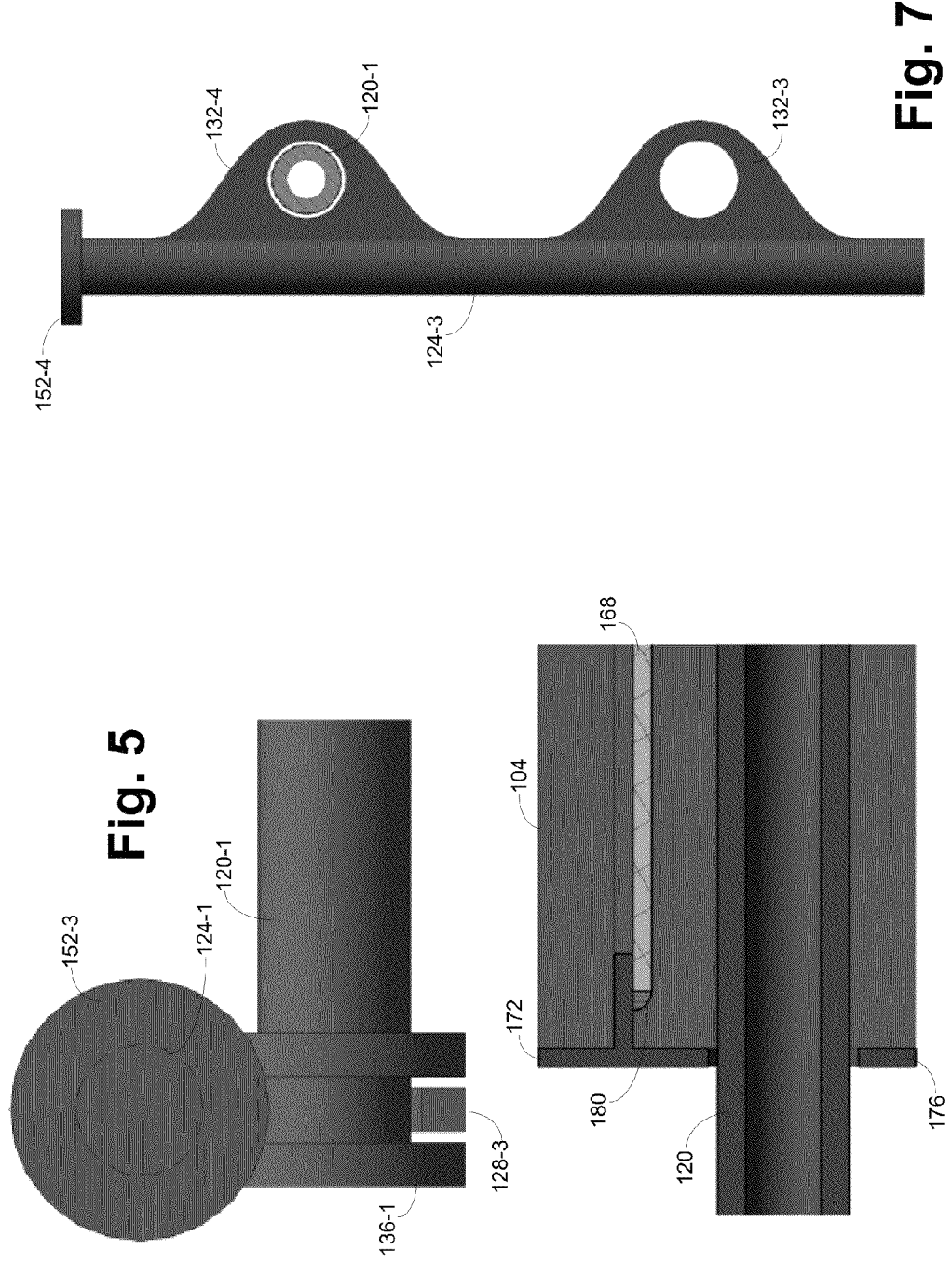

US 9,204,756 B2

SLIDER GRILL

BACKGROUND OF THE INVENTION

This application relates generally to cooking equipment. More specifically, this application relates to a grill assembly for cooking food outdoors.

Outdoor cooking is a popular activity that takes place in many different environments. These include natural environments like campsites, parks, and backyards, but also include other environments like parking lots near sporting events, amusement parks, and other venues. While some popular barbecue grills use liquid propane or natural gas as a fuel, those fuels are not easily portable to different locations or venues. Individuals interested in portable grills generally prefer the use of fuels like wood or charcoal.

A number of different designs are known for wood or charcoal grills. These range from extremely simple structures like a plain metal grille intended to be disposed over rocks that encircle a campfire to other structures intended for the use of charcoal. A typical charcoal grill has a metal housing with a top opening coverable with a hinged or otherwise removable lid. A charcoal grate is supported within a lower portion of the housing, with a food grate supported thereover within the housing. The two grates are installed within the housing by dropping them into the housing, which typically supports them with a series of upper and lower internal support tabs, enabling the grates to be removed to insert charcoal in the bottom portion of the housing.

Such conventional grills suffer from a number of drawbacks and limitations. For example, they are not very versatile, being designed exclusively for the use of either wood or charcoal as a fuel. Charcoal designs in particular are often not easily portable and generally suffer from difficulties of removing charcoal residue after cooking. In addition, conventional designs are not readily suited for use in the wide variety of environments in which outdoor cooking is desirable.

Embodiments of the invention address these limitations by providing an easily portable grill suitable for use with both wood and charcoal fuels in a wide variety of different environments.

SUMMARY

Embodiments of the invention provide a portable cooking grill that comprises a plurality of upright posts, a plurality of rails, a grilling surface, and a fuel tray. Each rail couples a respective pair of the upright posts. The grilling surface is coupled with the plurality of rails and is adapted to support food for cooking. The fuel tray is coupled with the plurality of rails and adapted to receive a volume of fuel. At least one of the grilling surface or the fuel tray is slidably coupled with the plurality of rails to allow the grilling surface and fuel tray to be relatively moved into a plurality of distinct positions. A first of the plurality of distinct positions comprises a position in which the fuel tray is beneath the grilling surface. A second of the plurality of distinct positions comprises a position in which at least a portion of the fuel tray is not beneath the grilling surface.

In a particular embodiment, the second of the plurality of positions comprises a position in which no portion of the fuel tray is beneath the grilling surface.

In some embodiments, each of the plurality of upright posts comprises a beveled end adapted for insertion into the ground. Each of the plurality of upright posts may also comprise a flared end opposite the beveled end for receiving force from an impact tool. Each of the plurality of upright posts may comprise a depth indicator.

A distal end of each of the plurality of rails may be coupled with a receiving member comprised by distal ones of the upright posts. In some instances, each of the distal ones of the upright posts comprises a plurality of such receiving members. Similarly, a proximal end of the each of the plurality of rails may be received by a hole in a protrusion comprised by proximal ones of the upright posts. Each protrusion may sometimes comprise a plurality of such holes.

The fuel tray may comprise a charcoal tray adapted to receive a volume of charcoal. The fuel tray may comprise a fuel-tray body, a frame, and an inset. The fuel-tray body has a bottom surface and a plurality of side surfaces integral with the bottom surface to define an open receptacle. The frame is coupled with the bottom surface exterior to the open receptacle. The inset is coupled with the frame and with the bottom surface, and configured to maintain a position of the fuel tray in at least one of the plurality of distinct positions. The fuel tray may also comprise a handle. The frame comprises a plurality of proximal protrusions and a plurality of distal protrusions, each of the proximal and distal protrusions being adapted to receive one of the plurality of rails. The distal protrusions may be substantially flat with the proximal protrusions being substantially nonflat.

In other embodiments of the invention, a kit is provided that comprises a plurality of posts, a plurality of rails, a grilling surface, and a fuel tray. The plurality of rails are adapted for coupling with the plurality of posts. The grilling surface is adapted for coupling with the plurality of rails and adapted to support food for cooking. The fuel tray is adapted for coupling with the plurality of rails and adapted to receive a volume of fuel.

BRIEF DESCRIPTION OF THE DRAWINGS

A further understanding of the nature and advantages of the present invention may be realized by reference to the remaining portions of the specification and the drawings, wherein like reference labels are used through the several drawings to refer to similar components. In some instances, reference labels are followed with a hyphenated sublabel; reference to only the primary portion of the label is intended to refer collectively to all reference labels that have the same primary label but different sublabels.

FIGS. 1A and 1B provide isometric views of a slider grill in accordance with an embodiment of the invention, with FIG. 1A showing the grill in a closed position and FIG. 1B showing the grill in an open position;

FIG. 2 provides a top view of the slider grill of FIGS. 1A and 1B in a position intermediate between the open and closed positions;

FIG. 5 provides a detail of a rail rest used with the slider grill of FIGS. 1A and 1B;

FIG. 6 provides a detail of a frame section of the slider grill of FIGS. 1A and 1B;

FIG. 7 provides a detail of rail mounts used with the slider grill of FIGS. 1A and 1B;

DETAILED DESCRIPTION OF EXEMPLARY EMBODIMENTS

Figure 1B:
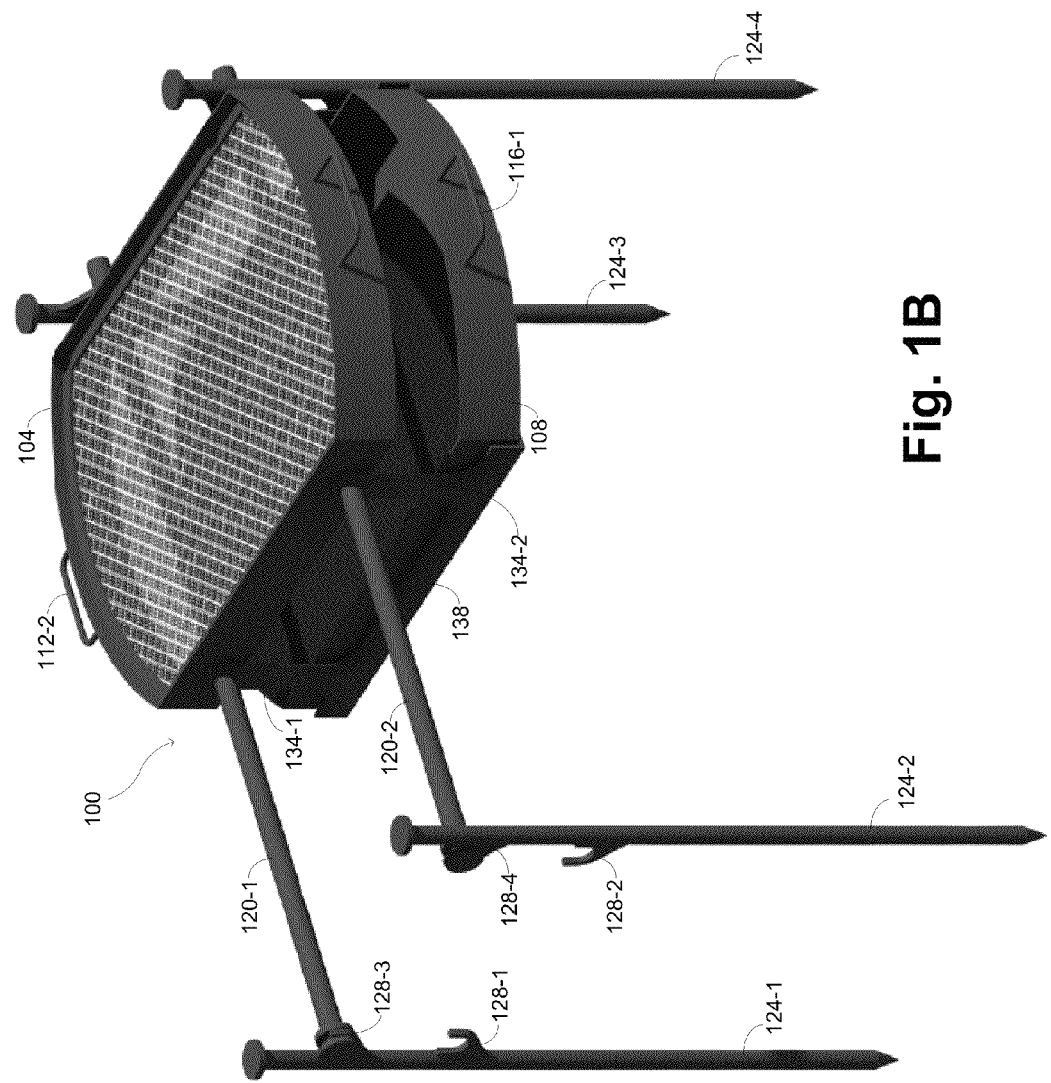
Figure 3:
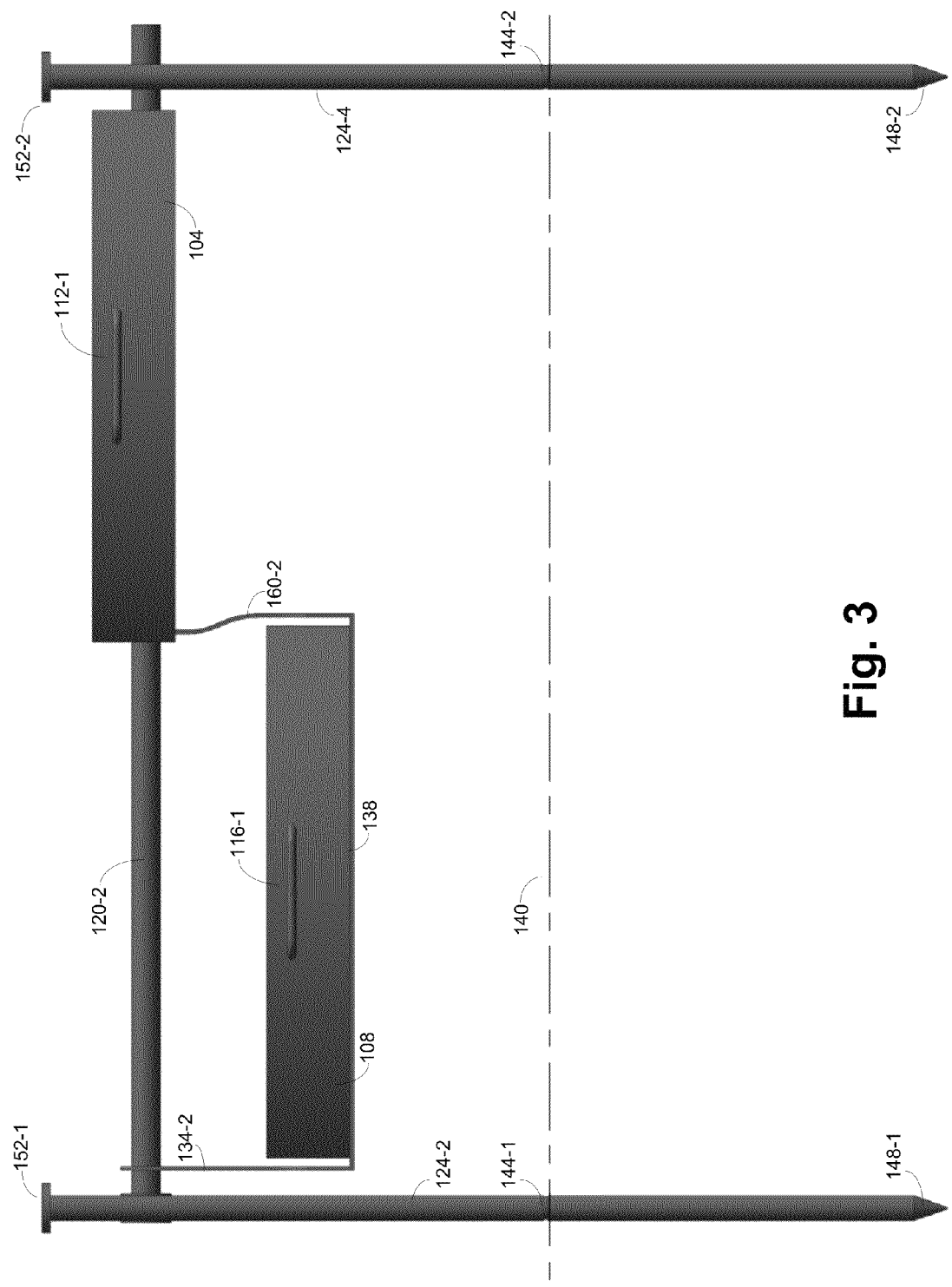
FIG. 3 provides a side view of the slider grill of FIGS. 1A and 1B in the open position shown isometrically in FIG. 1B.

Embodiments of the invention are directed to a grill for cooking food outdoors. The grill advantageously allows for cooking over open fires like campfires or for cooking using a fuel supplied to a fuel tray such as charcoal provided to a charcoal tray. While the description that follows sometimes makes reference to charcoal specifically, it is to be understood that this is done merely by way of illustration and that alternative fuels may be supplied to the fuel tray in alternative embodiments, such as various charcoal substitutes that are known in the art. While many such charcoal substitutes are solid, the invention may also be used with liquid charcoal substitutes that have been developed.

The fuel tray is coupled mechanically with a grilling surface such that at least one of the fuel tray and grilling surface may be slidably moved to achieve at least two positions: a first position in which the fuel tray is disposed substantially beneath the grilling surface and a second position in which at least a portion of the fuel tray is not beneath the grilling surface. It is noted that such relative slidable movement may be achieved with a substantially fixed grilling surface and moveable fuel tray, with a substantially fixed fuel tray and moveable grilling, or with a moveable fuel tray and moveable grilling surface. It is generally expected that cooking of food takes place when the fuel tray is in the first position, although cooking may also be accomplished in various intermediate positions accessible by the sliding mechanism so that only a portion of the grilling surface is heated.

In one particular embodiment, the second position comprises a position in which no portion of the fuel tray is beneath the grilling surface. Such a second position advantageously enables the heat source for cooking to be displaced substantially entirely from the grilling surface. This allows greater control over the application of cooking heat, may avoid burning food, permits prompt response to observed cooking conditions, and allows other food preparations to be made substantially without the application of heat to the grilling surface.

In some embodiments, the grill may be provided in a pre-assembled form, but in other embodiments, the grill may be provided as a kit that may be assembled and disassembled as appropriate, thereby increasing the portability of the grill.

The invention may be understood with reference to FIGS. 1A-9B, which provide various views of the grill. The following description simultaneously references the various views, some of which are more illustrative for particular features. The isometric views of FIGS. 1A and 1B respectively show the assembled grill 100 in the open and closed positions. The grill 100 generally comprises a grilling surface 104 and a fuel tray 108, each of which is composed of a material such as metal suitable to withstand normal cooking temperatures. The grilling surface 104 is shown as substantially flat, with a latticework structure that promotes the direct transfer of heat to food placed on the grilling surface 104, but may more generally have arcuate or other shapes. For example, in some alternative embodiments, the grilling surface 104 may comprise a plurality of distinct levels that enable food to be subject to different heat levels. Merely by way of example, such distinct levels might provide for a "cooking level," a "warming level," and the like. It is also emphasized that the latticework structure is provided by way of illustration; more generally, the grilling surface 104 may comprise and structure effective to promote heat from an underlying heat source to food placed on the grilling surface. This might include a series of parallel or nonparallel rods, a thin flat sheet of metal, or other structures.

When the grill 100 is in the open position shown in FIG. 1A or when the fuel tray 108 has been removed, the grilling surface 104 may be disposed directly over an open fire such as a campfire that provides the source of heat. When the grill 100 is in the closed position shown in FIG. 1B, the grilling surface 104 is disposed over the fuel tray 108, with the burning of fuel in the fuel tray 108 providing the source of heat.

The grilling surface 104 may comprise one or more handles 112 to facilitate movement or carrying of the structure. Similarly, the fuel tray 108 may comprise one or more handles 116 to facilitate movement or carrying of the fuel tray. When the structure is disassembled, the handles 112 and 116 may be especially convenient for moving the grilling surface 104 and fuel tray 108 separately.

The grill 100 is supported by a plurality of posts 124. While the drawings show a structure in which four posts 124 are provided, this is also exemplary, and alternative embodiments may use a different number of posts 124. The structure of the posts shown in the drawing is exemplary, with each of the posts including a beveled end 148 suitable for insertion into the ground or other pliable surface and a flared end 152 suitable to receive the force of a mallet or other tool to aid in insertion of the posts 124 into the ground or other pliable surface. Such a structure is particularly suitable for deployments of the grill 100 in environments like campsites, backyards, or the like, where the grill 100 is to be used over the ground. In other embodiments, such features as the beveled ends 148 and flared ends 152 may be omitted or substituted with other characteristics. For example, structures in which the beveled ends 148 are replaced with flat ends, perhaps including low-friction caps made of rubber or a similar material, may be especially suitable for deployment of the grill 100 in environments like parking lots near sporting events, on concrete sidewalks, on wooden decks, or the like. In some instances, assembly kits for the grill 100 may include a plurality of sets of posts to enable the grill to be used in different such environments.

Figures 4A, 4B:
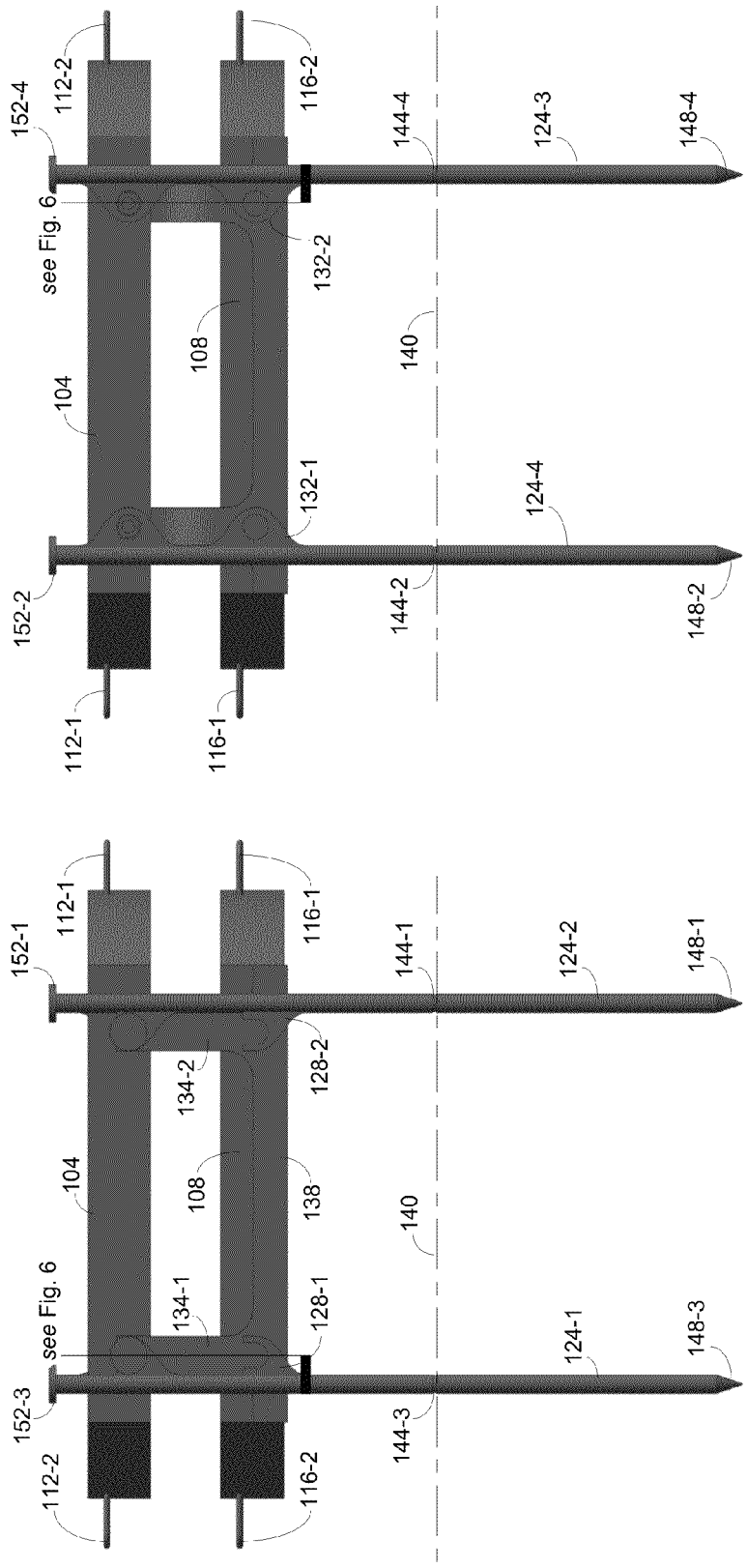
FIGS. 4A and 4B provide end views of the slider grill of FIGS. 1A and 1B.

As best shown in the front and rear end views of FIGS. 4A and 4B respectively, each of the posts 124 may include depth indicators 144. When provided at a uniform distance from the beveled ends 148, as indicated by reference line 140, the depth indicators 144 allow the posts 124 to be disposed in the ground at a substantially uniform depth, ensuring that the grilling surface 104 is substantially horizontal. While the illustration shows only a single depth indicator 144 on each post 124, multiple depth indicators may be provided in alternative embodiments, enabling the grill 100 to be disposed over the ground at different substantially horizontal heights.

The posts 124 are coupled with a plurality rails 120. While the drawings show two rails 120, it is understood that any plural number of rails 120 may be used in alternative embodiments. The grilling surface 104 comprises a structure with holes through which the rails 120 extend. The rails 120 may be affixed to the posts 124 using any suitable mechanism, one example of which is shown in detail in FIG. 5. In this example, which is used to affix the rails 120 to the front posts 124-1 and 124-2, a plurality of spaced-apart protrusions 136 are provided at an end of the rail 120, enabling the intermediate portion of the rail 120 to be accepted by shaped receiving members 128 coupled to respective posts 124. While it is possible to use the same mechanism to affix the rails 120 to the rear posts 124-3 and 124-4, the drawings illustrate an alternative affixation mechanism in detail in FIG. 7 that comprises protrusions 132 extending from the respective posts 124 and including a hole sized for receipt of the respective rails 120. While embodiments may be provided in which the same affixation mechanism is used for all posts 124, the use of different affixation mechanisms as illustrated in the drawings advantageously simplifies assembly of the grill 100. Specifically, the affixation mechanism shown in FIG. 7 provides greater structural support to the grill 100 while the affixation mechanism shown in FIG. 5 simplifies assembly of the grill 100 over a campfire or location.

The drawings also show the inclusion of the plurality of spaced-apart protrusions 136 in FIG. 5 and the protrusions 132 in FIG. 7. Generally, these structures are provided at corresponding positions on the posts 124 to ensure deployment of the grill 100 achieves a horizontal grilling surface 104. In combination with the depth indicators 144, the inclusion of a plurality of such structures on each post 124 enables assembly to be effected with the grilling surface 104 at different heights above the ground or other surface. In alternative embodiments, only a single structure is provided with each post 124 or a plurality of structures greater than two is provided.

The detail of FIG. 6 shows that the grilling surface 104 may comprise structural members 172 and 176, and that the latticework or other structure 168 may be spot welded 180 to such structural members.

Figure 8B:
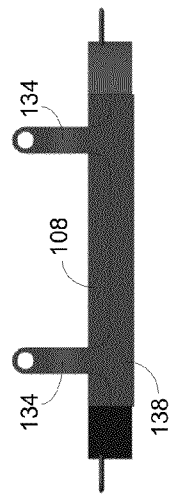
FIGS. 8A-8D provide detail views of a charcoal pan used with the slider grill of FIGS. 1A and 1B.
Figure 8A:
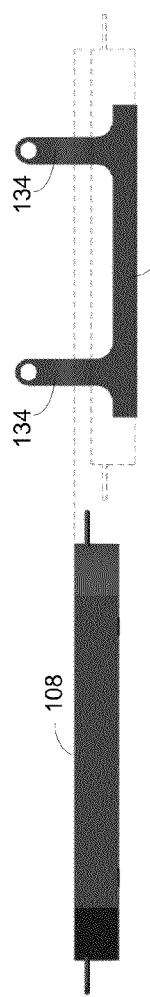
Figure 8D:
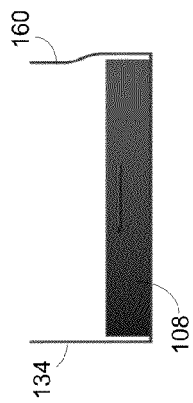
Figure 8C:
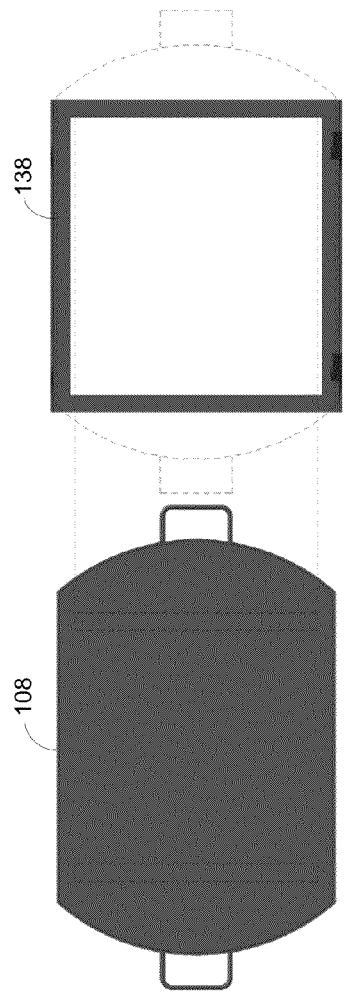

Detail views of the fuel tray 108 visible in FIGS. 1A, 1B, 2, 3, and 4 are provided in FIGS. 8A-8D. FIGS. 8A and 8B provide end views with FIG. 8A showing the fuel tray 108 itself and support frame 138 separately and FIG. 8B showing them together. The support frame 138 includes front protrusions 134, each of which includes a hole for receiving respective ones of the rails 120. FIG. 8C shows a top view of the fuel tray 108 and support frame 138, which also includes rear protrusions 160 shown in FIG. 8D. The rear protrusions 160 also include holes for receiving respective ones of the rails 120. While the front protrusions 134 may be generally flat so that they substantially abut the front posts 124-1 and 124-2 when the grill 100 is in the open position shown in FIG. 1A, the rear protrusions 160 may be jogged, with a top of the rear protrusions disposed within the structure defining the grilling surface 108. Such a configuration provides a stopping point when the fuel tray 108 is slid along the rails 120 that defines the open position.

Figure 9A:
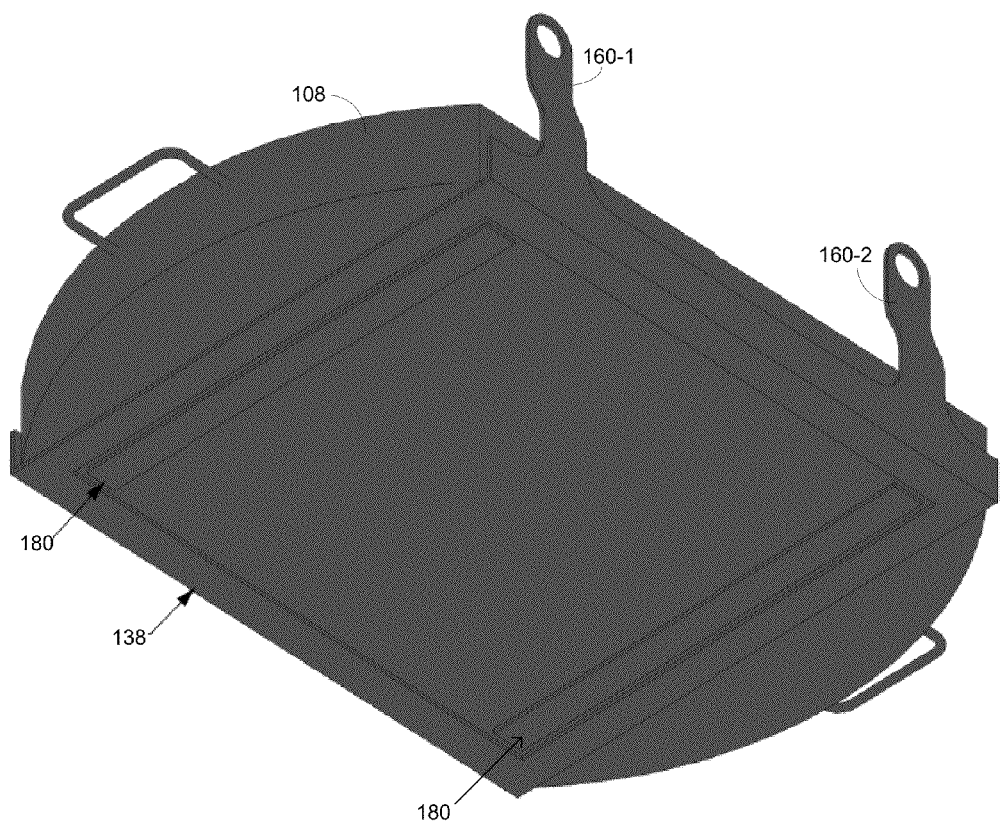
FIG. 9A provides an isometric view of the charcoal pan of FIGS. 8A-8D.
Figure 9B:
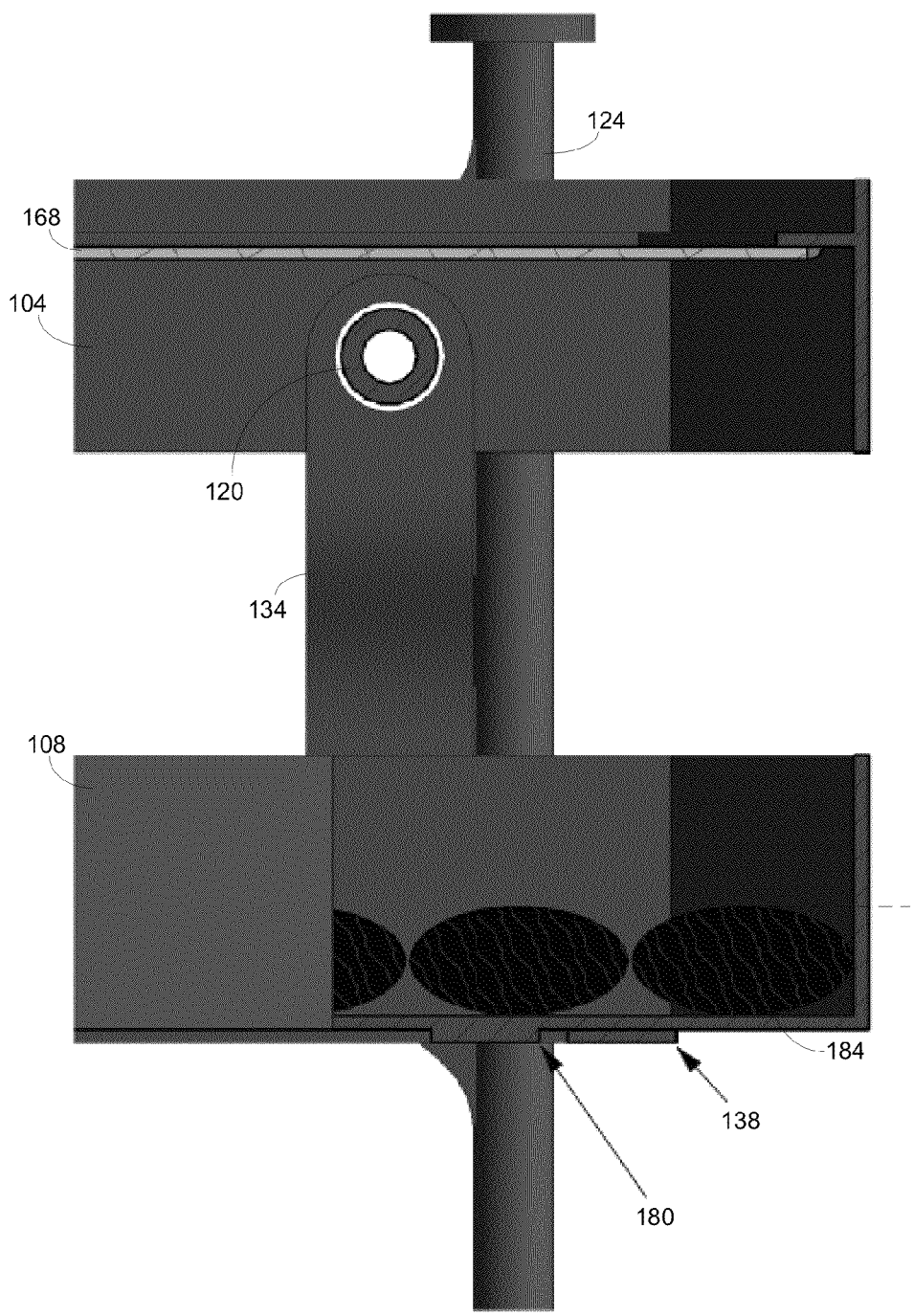
FIG. 9B provides a side detail view illustrating a relationship between a grilling surface and charcoal pan of the slider grill of FIGS. 1A and 1B

FIG. 9A provides an isometric illustration of the fuel tray 108 in which the structure of the rear protrusions 160 is evident, as well as showing the presence of spot welds 180 at the bottom of the fuel tray 108, used to hold the fuel tray 108 in position. The side view of FIG. 9B further illustrates the mechanism for holding the fuel tray 108 in position, also showing the presence of briquettes 184 within the fuel tray 108 to provide fuel.

Having described several embodiments, it will be recognized by those of skill in the art that various modifications, alternative constructions, and equivalents may be used without departing from the spirit of the invention. For example, the illustrative embodiments described above describe particular sliding mechanisms, but this is not intended to be limiting. More generally, and as will be understood by those of skill in the art, any suitable sliding mechanism may be used, including metal-to-metal low-friction movement, rolling mechanisms mounten on the grilling surface or frame, an arrangement of shaft-collar connections, and the like. Accordingly, the above description should not be taken as limiting the scope of the invention, which is defined in the following claims.

What is claimed:

1. A portable cooking grill comprising:
   a plurality of upright posts disposable relative to and extending from a ground surface;
   a plurality of support rails, the plurality of support rails supportively engaged by respective pairs of the plurality of upright posts at opposing end portions of the plurality of support rails such that the plurality of support rails extend perpendicularly relative to the plurality of upright posts a distance from the ground surface, each upright post of the respective pair of the plurality of upright posts being separated by a distance corresponding to a length of a respective one of the plurality of support rails, wherein each respective one of the plurality of support rails extends continuously between the respective pair of the plurality of upright posts;
   a grilling surface supportably engaged in slidably coupled relation with the plurality of support rails, the grilling surface adapted to support food for cooking; and
   a fuel tray supportably engaged in slidably coupled relation with the plurality of support rails supportably engaging the grilling surface, the fuel tray adapted to receive a volume of fuel,
   wherein:
      at least one of the grilling surface or the fuel tray is slidable relative to the plurality of support rails to position the grilling surface and fuel tray into a plurality of distinct positions along an axis parallel with the plurality of support rails while maintaining the supportable engagement of the grilling surface and the fuel tray by the plurality of support rails throughout the plurality of distinct positions;
      a first of the plurality of distinct positions comprises a position in which the fuel tray is beneath the grilling surface; and
      a second of the plurality of distinct positions comprises a position in which no portion of the fuel tray is beneath the grilling surface.

2. The portable cooking grill recited in claim 1 wherein each of the plurality of upright posts comprises a beveled end adapted for insertion into the ground surface.

3. The portable cooking grill recited in claim 2 wherein each of the plurality of upright posts comprises a flared end opposite the beveled end for receiving force from an impact tool.

4. The portable cooking grill recited in claim 1 wherein each of the plurality of upright posts comprises a depth indicator.

5. The portable cooking grill recited in claim 1 wherein the fuel tray comprises a charcoal tray adapted to receive a volume of charcoal.

6. The portable cooking grill recited in claim 1 wherein a distal end of each of the plurality of rails is coupled with a receiving member comprised by distal ones of the upright posts.

7. The portable cooking grill recited in claim 6 wherein each of the distal ones of the upright posts comprises a plurality of such receiving members.

8. The portable cooking grill recited in claim 6 wherein a proximal end of the each of the plurality of rails is received by a hole in a protrusion comprised by proximal ones of the upright posts.

9. The portable cooking grill recited in claim 8 wherein the protrusion comprises a plurality of such holes.

10. The portable cooking grill recited in claim 1 wherein a proximal end of each of the plurality of rails is received by a hole in a protrusion comprised by proximal ones of the upright posts.

11. The portable cooking grill recited in claim 10 wherein the protrusion comprises a plurality of such holes.

12. The portable cooking grill recited in claim 1 wherein the fuel tray comprises:
- a fuel-tray body having a bottom surface and a plurality of side surfaces integral with the bottom surface to define an open receptacle;
- a frame coupled with the bottom surface exterior to the open receptacle; and
- an inset coupled with the frame and with the bottom surface, the inset configured to maintain a position of the fuel tray in at least one of the plurality of distinct positions.

13. The portable cooking grill recited in claim 12 wherein the fuel tray further comprises a handle.

14. The portable cooking grill recited in claim 12 wherein the frame comprises a plurality of proximal protrusions and a plurality of distal protrusions, each of the proximal and distal protrusions adapted to receive one of the plurality of rails.

15. The portable cooking grill recited in claim 13 wherein:
- the distal protrusions are substantially flat; and
- the proximal protrusions are substantially nonflat.

16. The portable cooking grill recited in claim 1 wherein the grilling surface comprises a handle.

17. A kit comprising:
- a plurality of posts disposable relative to and extending from a ground surface;
- a plurality of support rails supportively engaged by respective pairs of the plurality of posts at opposing end portions of the plurality of the support rails such that the plurality of support rails extend perpendicular relative to the plurality of posts a distance from the ground surface, each upright post of the respective pair of the plurality of upright posts being separated by a distance corresponding to a length of a respective one of the plurality of support rails, wherein each respective one of the plurality of support rails extends continuously between the respective pair of the plurality of upright posts;
- a grilling surface adapted for slidably coupling with the plurality of support rails to slide the grilling surface for positioning into a plurality of distinct positions along an axis parallel with the plurality of support rails while maintaining the supportable engagement of the grilling surface by the plurality of support rails throughout the plurality of distinct positions and adapted to support food for cooking; and
- a fuel tray adapted for slidably coupling with the plurality of support rails to slide the fuel tray for positioning into a plurality of distinct positions along an axis parallel with the plurality of support rails while maintaining the supportable engagement of the fuel tray by the plurality of support rails throughout the plurality of distinct positions and adapted to receive a volume of fuel.

18. The kit recited in claim 17 wherein each of plurality of posts comprises:
- a beveled end adapted for insertion into the ground surface; and
- a flared end opposite the beveled end adapted to receive force from an impact tool.

19. The kit recited in claim 17 wherein each of the posts comprises a depth indicator.

20. The kit recited in claim 17 wherein the fuel tray comprises:
- a fuel-tray body having a bottom surface and a plurality of side surfaces integral with the bottom surface to define an open receptacle;
- a frame coupled with the bottom surface exterior to the open receptacle; and
- an inset coupled with the frame and with the bottom surface.

\* \* \* \* \*

UNITED STATES PATENT AND TRADEMARK OFFICE
CERTIFICATE OF CORRECTION

PATENT NO. : 9,204,756 B2  
APPLICATION NO. : 13/553547  
DATED : December 8, 2015  
INVENTOR(S) : Perry Handyside Page 1 of 1

It is certified that error appears in the above-identified patent and that said Letters Patent is hereby corrected as shown below:

In the specification,

Column 5, Line 63, delete "mounten" and therefore insert --mounted--

Signed and Sealed this  
Fourteenth Day of June, 2016

Michelle K. Lee  
*Director of the United States Patent and Trademark Office*